United States Patent [19]

Johnnerfelt et al.

[11] Patent Number: 4,962,440

[45] Date of Patent: Oct. 9, 1990

[54] SURGE ARRESTER

[75] Inventors: Bengt Johnnerfelt; Bengt Thors, both of Ludvika, Sweden

[73] Assignee: Asea Brown Boveri AB, Sweden

[21] Appl. No.: 252,050

[22] Filed: Sep. 30, 1988

[30] Foreign Application Priority Data

Oct. 26, 1987 [SE] Sweden ............................... 8704160

[51] Int. Cl.[5] ............................................... H02H 9/04

[52] U.S. Cl. .................................... 361/126; 361/128; 337/28; 338/21

[58] Field of Search ................................ 361/126-128, 361/117-119; 337/28, 29, 34; 338/21

[56] References Cited

U.S. PATENT DOCUMENTS

| | | | |
|---|---|---|---|
| 3,665,255 | 5/1972 | Jakszt et al. | 361/128 |
| 4,276,578 | 6/1981 | Levinson et al. | 361/127 |
| 4,404,614 | 9/1983 | Koch et al. | 361/126 X |

*Primary Examiner*—Todd E. DeBoer

[57] ABSTRACT

A surge arrester comprises a plurality of cylindrical arrester elements (11) of metal oxide varistor material which are arranged, with confronting end surfaces, between two end electrodes (13) in an elongated protective housing (10) which is resistant to deformation under the operating conditions for the surge arrester. The housing is of cross-linked HD polyethylene and is shrunk onto the envelope surfaces of the arrester elements and onto envelope surfaces on heat-absorbing metallic bodies (12) arranged between the arrester elements.

6 Claims, 2 Drawing Sheets

SURGE ARRESTER

BACKGROUND OF THE INVENTION

The present invention relates to a surge arrester comprising a plurality of cylindrical arrester elements of metal oxide varistor material, which are arranged one after the other in the axial direction of the arrester elements and between two end electrodes in an elongated protective housing of a plastic material, which housing is resistant to deformation under the operating conditions for the surge arrester and makes contact with the envelope surfaces of the arrester elements.

In the case of a passage of current, caused by overvoltages, through a surge arrester of the above-mentioned kind, the arrester elements are heated. When the passage of current is of considerable magnitude, the temperature may amount to 150°-200° C. In surge arresters which are subjected to such considerable heating, the choice of protective to a housing which, nearest the arrester elements, consists of a thermosetting resin, for example an epoxy resin in the form of a casting around the arrester elements, or in the form of an epoxy resin-impregnated wrapping of a fibre material, such as a woven glass fibre, around the arrester elements. A polymer in the form of a shrinkable hose or a shrinkable tube with projections for extending creep distance may be applied on the thermosetting resin.

According to the present invention, a protective housing which is resistant to deformation under operating conditions for the surge arrester and which remains intact when subjected to the influence of arrester elements which have been heated to temperatures of the magnitude stated above, can be provided in a considerably simpler way than what has previously been possible.

SUMMARY OF THE INVENTION

According to the present invention, the favourable results are achieved by making the protective housing from cross-linked HD polyethylene (High Density polyethylene), which is shrunk onto the arrester elements stacked on top of each other, and by arranging, between at least the main part of the arrester elements, heat-absorbing bodies of metallic material to make contact between confronting end surfaces of adjacent arrester elements. The wall thickness of the protective housing is made sufficient, preferably at least 2 mm, for the parts of the protective housing located furthest away from the arrester elements to attain a temperature, during maximum heating of the arrester elements, which is safely below the softening temperature of the cross-linked HD polyethylene, i.e., even if the inside of the protective housing is in contact with an arrester element which is briefly heated to a temperature in the vicinity of 200° C., the outside is not to be heated, in the presence of the heat-absorbing bodies, to a higher temperature than one which is safely below 130° C. The outside is preferably heated to at most around 100° C. The heat-absorbing bodies have a total length in the longitudinal direction of the protective housing which is at least 10%, and preferably 15-35%, of the total length of the arrester elements in the same direction.

The varistor material in the arrester element may be of a known kind, anf preferably 70-97 mole percent thereof consists of ZnO with additives of one or more oxides and/or carbonates of Bi, Sb, Cr, Mn, Co, Ni, Si, B, Ba, Pb, Al, each in an amount of 0.01-10 percent. The arrester elements are manufactured from a powder of the varistor material which, under known conditions, are moulded, pressed and sintered into bodies of the desired shape.

The electrodes on the end surfaces of the arrester element may, inter alia, consist of layers of copper or aluminium which have been applied by arc spraying or other spraying of metal, or of varnish layers which are electrically conductive, for example of epoxy resin containing powder or silver. It may also consist of surface layers in the varistor material itself which have been made low-ohmic by laser treatment.

Upon heating, cross-linked HD polyethylene is transformed from crystalline to substantially amorphous state. In the amorphous state, the shape of an object of the polymer material may be changed and, upon cooling, be brought to maintain the changed shape. If the object is heated again, the object resumes its original shape. This property of cross-linked HD polyethylene is utilized when it is applied around the stack of arrester elements disposed on top of each other with the heat-absorbing bodies disposed therebetween.

The cross-linked HD polyethylene is suitably of the kind which is manufactured by silane grafting of linear HD polyethylene and a subsequent cross-linking of the grafted polymer after extrusion or other moulding by the moulded product being subjected to moisture or water so that the hydrolyzable groups in the silane radical are hydrolyzed and provide siloxane bonds between the grafted polyethylene molecules. This cross-linked HD polyethylene has a softening temperature of around 130° C.

The end electrodes, which like the heat-absorbing bodies may advantageously be of aluminium or copper, are preferably provided with annular recesses or projections, into which and between which, respectively, parts of the protective housing project.

Particularly if the surge arrester is intended for outdoor use, the protective housing is provided on the outside with means extending the creep distance. This can be done by covering the outside of the protective housing with a separate creep distance extending body, supported by the protective housing, preferably a body which in a known manner is formed with a plurality of projections arranged one after the other in the longitudinal direction of the protective housing. It can also be done by forming the outside of the protective housing itself with a plurality of creep distance extending projections arranged one after the other in the longitudinal direction of the protective housing. The projections are then of the same material as the protective housing and form a coherent unit with the rest of the protective housing.

BRIEF DESCRIPTION OF THE DRAWINGS

The invention will be explained in greater detail, by way of examples, with reference to the accompanying drawing, wherein.

DETAILED DESCRIPTION OF THE PREFERRED EMBODIMENT

Figure 1:
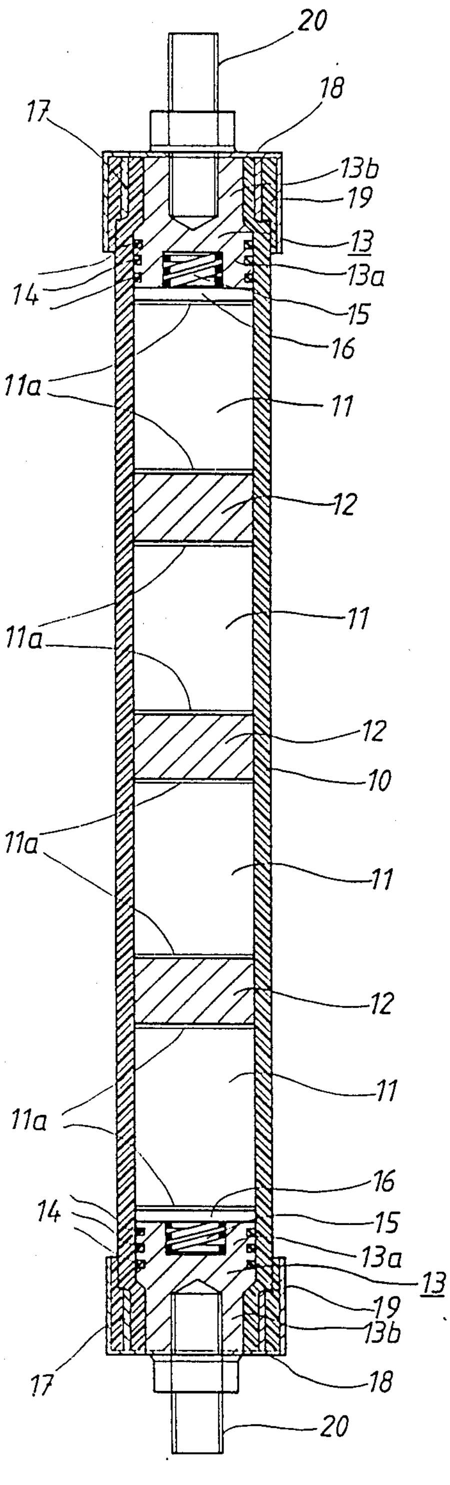
FIG. 1 shows an axial section through a surge arrester according to the present invention without any creep distance extending means.

A tube of cross-linked HD polyethylene (silane-grafted), which in one case, selected as example, has an inner diameter of 28 mm and a wall thickness of 3 mm, is placed in a tube of steel or aluminium with an inner diameter of 38 mm. The tubes are heated to 150° C., whereafter the polyethylene tube is expanded by compressed air supplied to the interior of the polymer tube, so that its outer envelope surface makes contact with the inside of the metal tube. Thereafter, the tubes are cooled down in this expanded state of the polymer tube, whereby its inner diameter becomes 32 mm. The expansion can also be performed, inter alia, with a mandrel. When the metal tube has been removed, there are placed in the tube of HD polyethylene (in shrunk state designated 10 in FIG. 1), one after the other into a stack (shown in FIG. 1), a plurality of arrester elements 11 in the form of circular-cylindrical ZnO blocks provided with electrodes alternately with a plurality of heat-absorbing bodies 12 in the form of circular-cylindrical blocks of aluminium and, in each end of the stack, an electrode 13 in the form of a substantially circular-cylindrical block of aluminium. In the exemplified case, the ZnO blocks 11 have a diameter of 30 mm and a height of 47 mm and the aluminium blocks 12 the same diameter and a height of 15 mm. That part 13*a* of the aluminium blocks 13 which faces the interior of the surge arrester has a diameter of 30 mm, and that part 13*b* of the aluminium blocks 13 which faces away from the interior has a diameter of 28 mm. The blocks 13 have a height of 40 mm. They are provided with annular slots or recesses 14 with a depth of 2 mm and, at the end facing the interior of the surge arrester, with a spring 15 which exerts a pressure on a washer 16, in the exemplified case of aluminium. When the stack of the blocks 11, 12 and 13 has been placed in the expanded cross-linked tube of HD polyethylene, the blocks and the tubes are heated to a temperature of 150° C. This causes the tube 10 to shrink so as to make contact with the envelope surfaces of the blocks 11, 12 and 13, as is clear from FIG. 1, and so as to penetrate into the slots 14 and form a protective housing for the arrester elements. The springs 15 ensure that the blocks 12 and 13, the latter via the washers 16, make contact, with an effective contact pressure, with the electrodes 11*a* secured to the end surfaces of the ZnO blocks and consisting of sprated-on layers of aluminium. The wall thickness of the tube, after shrinking, is still 3 mm.

That part of the protective housing which makes contact with the part 13*b* on each end electrode 13 is surrounded with a binding strap or a hose clamp 17 to strengthen the fixing of the protective housing to the end electrodes. Over the outer portion of each end electrode there is arranged a cap 18, for example of aluminium, together with a seal, for example in the form of an O-ring or a sealing compound 19, such as silicone rubber. Finally, the surge arrester is provided with terminals 20. The surge arrester according to FIG. 1 is designed for indoor use.

Figure 2:
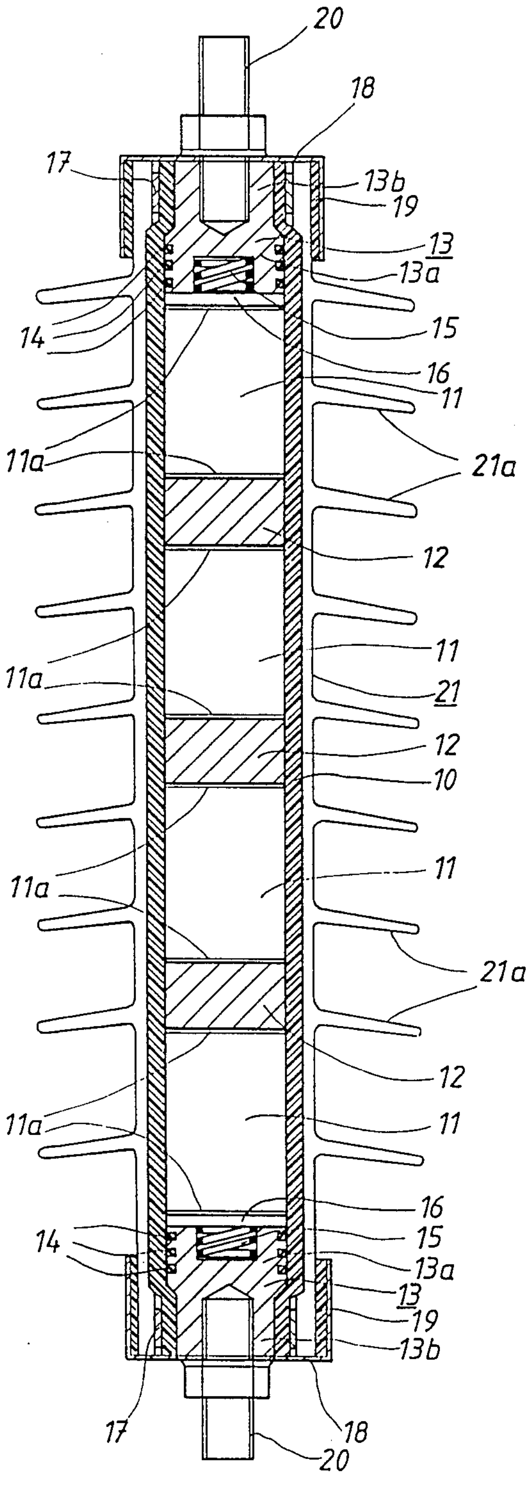
FIG. 2 shows an axial section through such a surge arrester with a creep distance extending means.

Surge arresters according to the present invention, which are designed for outdoor use, are provided, as is clear from FIG. 2, with a creep distance extending body 21, which is formed with a plurality of projections 21*a* arranged one after the other in the longitudinal direction of the protective housing. The body 21 may be of an elastomer, for example ethylene propylene terpolymer (EPDM rubber) and is passed over the protective housing 10. It may also consist of a shrinking plastic, for example of a cross-linked ethylene-propylene polymer or cross-linked HD polyethylene applied on the protective haousing 10 by shrinkage. The body 21 is applied on the protective housing 10 before the cap 18 is fitted.

According to one embodiment of the invention, a creep distance extending body 21 is formed with the same shape as that shown in FIG. 2 as part of the protective housing 10, so that the parts 10 and 21 form a coherent unit of cross-linked HD polyethylene manufactured in one piece. In the forming operation, the protective housing is then provided with a plurality of creep distance extending projections, arranged one after the other in the longitudinal direction of the protective housing, of a kind analogous to those designated 21*a* in FIG. 2. The protective housing is then preferably manufactured by injection moulding, since a manufacture by extrusion of a thick-walled tube with subsequent milling away of material for forming projections would involve a considerable material waste.

Figure 3:
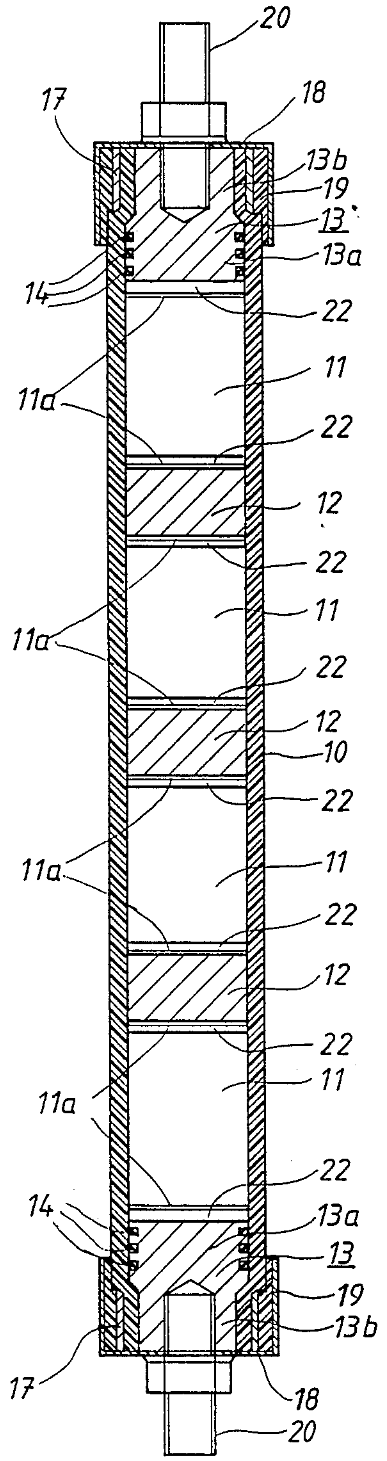
FIG. 3 shows a modification of the surge arrester according to FIG. 1.

FIG. 3 illustrates an alternative embodiment of the surge arrester according to FIG. 1. The surge arrester shown in FIG. 3, with a creep distance extending body 21 in a manner similar to that shown in FIG. 2, may be used for outdoor use. In accordance with FIG. 3, spring elements in the form of disc springs 22 are arranged between the arrester elements 11 and the heat-absorbing bodies 12 and between the arrester elements 11 and the end electrodes 13 to ensure that an effective contact pressure is maintained between the parts 11, 12 and 13 in the entire stack under varying conditions. Instead of cup springs there may be used springs 15 of the kind shown in FIGS. 1 and 2 which are built into the end electrodes in the manner shown in FIGS. 1 and 2 and in analogous manner into the heat-absorbing bodies.

We claim:

1. A surge arrester which is resistant to deformation when current flows therethrough, said surge arrester comprising a generally tubular protective housing which is made of cross-linked high density polyethylene and which has a wall thickness of at least 2 mm, two spaced apart end electrodes located within said protective housing, a plurality of cylindrical arrester elements positioned within said protective housing and between said end electrodes, each arrester element being made of a metal oxide varistor material and each defining a central axis, an internal side surface and opposite end surfaces which are perpendicular to said central axis, each end surface including an electrode, and a plurality of metallic heat-absorbing bodies positioned within said protective housing, each metallic heat-absorbing body being positioned between and in electrical contact with electrodes on end surfaces of two adjacent arrester elements which face one another, said heat-absorbing bodies extending between said end electrodes a length at least 10% of a total length that said arrester elements extend between said end electrodes, said wall of said protective housing being in intimate contact with said external side surfaces of said arrester elements as a result of being shrunk thereon.

2. A surge arrester according to claim 1, wherein the end electrodes are at least substantially cylindrical and the protective housing is in intimate contact with said end electrodes as a result of being shrunk thereon.

3. A surge arrester according to claim 1, wherein said end electrodes are provided with annular recesses, said protective housing including portions which project into said annular recesses.

4. A surge arrester according to claim 1, including a creep distance extending body which surrounds said protective housing.

5. A surge arrester according to claim 1, wherein said protective housing includes a plurality of creep distance extending projections arranged one after the other in a longitudinal direction of the protective housing, said projections being made of cross-linked high density polyethylene and forming a coherent unit with the protective housing.

6. A surge arrester according to claim 1, including a spring element positioned between adjacent arrester elements and heat-absorbing bodies.

* * * * *